United States Patent [19]

Belart et al.

[11] Patent Number: 4,658,168

[45] Date of Patent: Apr. 14, 1987

[54] DEVICE FOR MONITORING THE CIRCUMFERENTIAL SPEED OF A TOOTHED DISC CAPABLE OF BEING ROTATED

[75] Inventors: Juan Belart, Walldorf, Fed. Rep. of Germany; Andre Goossens, Rumst, Belgium

[73] Assignee: ITT Industries, Inc., New York, N.Y.

[21] Appl. No.: 631,626

[22] Filed: Jul. 17, 1984

[30] Foreign Application Priority Data

Jul. 29, 1983 [DE] Fed. Rep. of Germany ....... 3327400

[51] Int. Cl.$^4$ ............................................. H02K 19/20
[52] U.S. Cl. .................................................... 310/168
[58] Field of Search .......................... 310/168, 155, 68

[56] References Cited

U.S. PATENT DOCUMENTS

| | | | |
|---|---|---|---|
| 3,761,751 | 9/1973 | Fink et al. ............................ | 310/168 |
| 3,782,136 | 1/1974 | Ploppa et al. .................... | 310/168 X |
| 4,011,478 | 3/1977 | Reenstra .......................... | 310/168 X |

*Primary Examiner*—Donovan F. Duggan
*Attorney, Agent, or Firm*—James B. Raden; William J. Michals

[57] ABSTRACT

A device for monitoring the circumferential speed of a toothed disc (1) capable of being rotated, with a sensor (4) arranged at a defined distance (s) from the toothed rim (2) of the toothed disc (1) and with a sensor casing (7) supported at and securable to a stationay guide member. In order to avoid the need of any additional adjustment of the distance (s) in the event of remounting the sensor (4), a bushing (9) is provided as a guide member which is adapted to be fastened to a carrier element (14) by screw means and which projects into a bore (8) of the casing (7). To arrange a threaded bore (15) in the casing (7), the bore (15) is adapted to accommodate a screw (16) into contact with the bushing (9).

4 Claims, 1 Drawing Figure

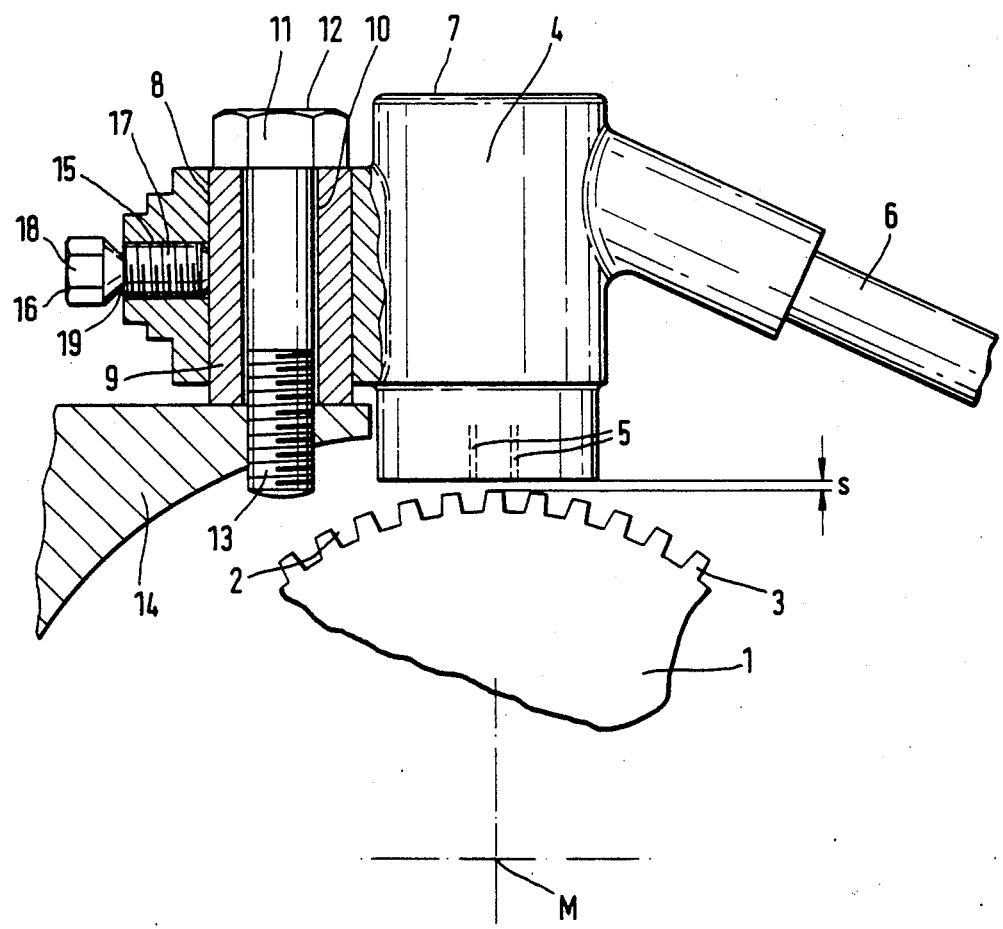

ically set torsional moment. This mounting process assures that the sensor casing 7 is fixed relative to the bushing 9 so that subsequent removal and remounting of the sensor 4 can be performed without an adjustment of the sensor 4 being necessary.

DEVICE FOR MONITORING THE CIRCUMFERENTIAL SPEED OF A TOOTHED DISC CAPABLE OF BEING ROTATED

BACKGROUND OF THE INVENTION

The present invention relates to a device for monitoring the circumferential speed of a toothed disc capable of being rotated, with a sensor arranged at a defined distance from the toothed rim of the toothed disc and with a sensor casing supported at and securable to a stationary guide member.

Such a device is known from the German patent specification 21 13 307. In the prior art the casing accommodating the sensor is guided in a slotted hole of a carrier element, with the sensor casing so being slidable within the slotted hole. Once the distance between the pole pieces and the toothed rim is established, the sensor casing is fixed by screw means within the guide so that an undesirable alteration of the distance is excluded. The distance between the toothed disc and the pole pieces of the sensor is adjusted by interposing between the said parts a plastic layer of defined thickness which is worn off in the course of the initial revolutions of the toothed disc.

In the described configuration, the distance between the sensor and the toothed rim of the toothed disc requires adjustment upon a removal of the sensor, which necessitates the availability of an adequate plastic layer of a defined thickness. On the other hand, the distance between the sensor and the toothed disc is adjusted by means of a guage, which is very time-consuming and may give rise to errors directly affecting the evaluation of the signals of the sensor.

Accordingly, the object of the present invention is to provide a device of the kind mentioned in the beginning in which adjustment of the sensor in the event of remounting is unnecessary.

SUMMARY OF THE INVENTION

According to the invention, this object is achieved wherein a bushing adapted to be fixed to a carrier element by screw means is employed as a guide member, with the bushing projecting into a bore of the casing of the sensor and in that a threaded bore is arranged in the casing, which bore is adapted to bring a screw into contact with the bushing. During initial mounting of the sensor, the sequence accordingly is to first fix the bushing to be carrier element by screw means. The bushing is then introduced into the bore of the sensor casing and the specified distance adjusted between the pole pieces and the toothed rim of the toothed disc. Once the desired distance has been attained, the sensor casing is fixed relative to the bushing by means of a screw which takes support at the external surface of the shell of the bushing. If it should become necessary to remove the sensor, e.g. for an inspection of the sensor, then the fixation screw of the bushing is unfastened. When remounting the sensor the bushing is refastened to the carrier element in which event a renewed adjustment of the sensor is unnecessary since the position of the sensor casing relative to the bushing remains unchanged.

In an advantageous further embodiment of the present invention, the screw is furnished with a predetermined breaking point by means of which the screwhead separates from the threaded stem at a predeterminable torque. During initial mounting of the sensor, after having adjusted the desired distance between the pole pieces and the toothed rim of the toothed disc, the screwhead detached from the threaded stem thereby avoiding any unintentional alteration of the position of the sensor casing relative to the bushing in the event of a removal and remounting of the sensor. In that context, the predetermined breaking point is conveniently positioned within the casing of the sensor.

For the purpose of securing the bushing to the carrier element, the bushing receives a threaded screw in an axial direction, with the screw being advancable into a threaded bore of the carrier element which retains the bushing abutted against the carrier element by means of an extended screwhead.

BRIEF DESCRIPTION OF THE DRAWING

The single drawing FIGURE illustrates a partial cross-sectional view of a monitoring device in accordance with the present invention.

DETAILED DESCRIPTION

In the drawing, reference numeral 1 designates a toothed disc which can be rotated about its center M. The circumference of the toothed disc 1 is provided with a toothed rim 2 which is composed of a plurality of teeth 3. The circumferential speed of the toothed disc 1 is monitored with the aid of a sensor 4 which is equipped with two pole pieces 5 located at a defined distance s from the toothed rim 2. When the toothed disc 1 is rotating, alternating-current voltages are induced in the sensor 4 which are conveyed through a connecting line 6 to an electronic slippage monitor (not shown).

The sensor 4 is provided with a casing 7 the lefthand end of which as viewed in the drawing is furnished with a bore 8 in which there is arranged a bushing 9. The bushing 9 is, in its turn, provided with a central axial bore 10 which receives a threaded screw 11. The threaded screw 11 is furnished with a screwhead 12 which may for example have the shape of a hexagon head. The threaded stem 13 of the threaded screw 11 is screwed into a carrier element 14 so that the bushing 9 is retained abutted against the carrier element 14 by means of the screwhead 12.

The casing 7 of the sensor 4 includes a threaded bore 15 which ends in the bore 8. Into the threaded bore 15, a screw 16 is screwed which comprises a threaded stem 17 and a screwhead 18. Between the threaded stem 17 and the screwhead 18 of the screw 16, there is disposed a predetermined breaking point 19 with the aid of which the threaded stem 17 is detached from the screwhead 18 at a predeterminable torsional moment in the screw 16. In the embodiment revealed by the drawing, the screwhead 18 has the shape of a hexagon head.

The sequence for mounting the sensor 4 is to first secure the bushing 9 to the carrier element 14 by means of the threaded screw 11. Subsequently, the casing 7 of the sensor 4 with the bore 8 is slid over the bushing 9, wherein a sliding movement of the casing 7 relative to the bushing 9 is accomplished. Thereafter, the specified distance s between the pole pieces 5 and the toothed rim 2 is adjusted, wherein either a gauge is used or a plastic disc is snugly inserted between the pole pieces 5 and the toothed rim 2. The disc is provided of a thickness equal to the distance s. The screw 16 is then screwed into the threaded bore 15 of the casing 7, with the threaded stem 17 being separated from the screwhead 18 when a certain torque is applied to the screw 16, at the predetermined breaking point 19. The casing 7 of the sensor 4 is then firmly secured to the bushing 9 and to the carrier element 14 so that the distance s previously set and remains unchanged. If the sensor 4 has to be removed, for example to check its performance, then the threaded screw 11 is unscrewed from the carrier element 14. The sensor 4 will now be freely movable, with the casing 7 remaining rigidly coupled with the bushing 9 as previously established. During remounting of the sensor 4, the bushing 9 is screwed on to the carrier element 14 again with the aid of the screw 11. The device will now be restored to the position shown in the drawing, with the specified distance s between the pole pieces 5 and the toothed rim 2 of the toothed disc 1 remaining unchanged so that there is no need of a further adjustment of the said distance s.

What is claimed is:

1. A device for monitoring the circumferential speed of a toothed disc which is capable of being rotated, a sensor arranged at a defined distance from the toothed rim of the toothed disc and with a sensor casing supported at and removably secured to a stationary guide member, wherein a bushing (9) is adapted to be fixed to a carrier element (14) by first screw means and is employed as said guide member, said bushing (9) projecting into a bore (8) of said casing (7) and wherein a threaded bore (15) is disposed in said casing (7), said threaded bore (15) adapted to hold a second screw means (16) in contact with said bushing (9).

2. A device as claimed in claim 1, wherein said second screw means (16) is furnished with a predetermined breaking point (19) by means of which the head of said second screw (18) parts from the threaded stem of said second screw means (17) at a predetermined torque.

3. A device as claimed in claim 2, wherein said predetermined breaking point (19) is positioned within said casing (7) of the sensor (4).

4. A device as claimed in claim 1, wherein said bushing (9) includes an axial bore extending therethrough which receives said first screw means (11), said first screw means (11) being adapted to be screwed into a threaded bore of said carrier element (14) to retain said bushing (9) abutted against said carrier element (14) by means of an extended screwhead (12).

* * * * *